(12) United States Patent
Wei et al.

(10) Patent No.: US 6,744,400 B1
(45) Date of Patent: Jun. 1, 2004

(54) SYSTEM AND METHOD FOR EVALUATING UNIFORMITY OF A WAVE FIELD IN A RADAR CROSS SECTION TEST RANGE

(75) Inventors: Pax S. P. Wei, Bellevue, WA (US); Anthony W. Reed, Renton, WA (US); Eugene F. Knott, Ellensburg, WA (US); Craig N. Ericksen, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/404,471

(22) Filed: Mar. 31, 2003

(51) Int. Cl.[7] ................................................. G01S 7/40
(52) U.S. Cl. ....................... 342/165; 342/173; 342/194; 342/196
(58) Field of Search ........................... 342/4, 165, 173, 342/175, 192, 194, 196

(56) References Cited

U.S. PATENT DOCUMENTS

| | | | | |
|---|---|---|---|---|
| 4,860,016 A | * | 8/1989 | Westphal et al. | 342/169 |
| 4,879,560 A | * | 11/1989 | McHenry | 342/165 |
| 4,901,080 A | * | 2/1990 | McHenry | 342/1 |
| 5,386,737 A | * | 2/1995 | Soeder et al. | 73/865.9 |
| 6,556,023 B2 | * | 4/2003 | Okazaki | 324/637 |

OTHER PUBLICATIONS

"Design of the GE aircraft engine compact range facility", Silz, R.;Antennas and Propagation Society International Symposium, 2001. IEEE , vol.: 4, Jul. 8–13, 2001 pp.:432–435.*

"MMW radar cross section range characterizes targets", Scheer, J.A.; Chastain, W.E.; Alexander, N.T.; Bruder, J.A.; Scheer, C.R.; Horst,M.M.; Trostel, J.M.;Radar Conference, 1988., Proceedings of the IEEE National , Apr. 20–21, 1988 pp.: 209–213.*

Knott, E. F. et al., "Broadside Radar Echoes from Wires and Strings," Microwave Journal, vol. 42, Jan. 1999, pp. 102, 104, 106, 108 and 110.

Knott, E. F., "Radar Cross Section Measurements," Van Nostrand Reinhold, New York, 1993, pp. 326–338.

Mensa, D. L., "High Resolution Radar Cross–section Imaging," Artech House, Boston, 1991, pp. 115–116.

Wei, P. S. P., "Discrete Hilbert Transform and Analytic Envelope," Boeing Document D180–32736–1, Apr. 16, 1991 pp. 1–29, (unpublished).

Wei, P. S. P., "Study of DFT Windows for Radar Imaging," Proc., 17th Antenna Measurement Techniques Association (AMTA), Williamsburg, VA, Nov. 13–17, 1995, pp. 111–116.

Wei, P. S. P. et al., "Study of Wires and Strings of Finite Sizes," Proc., 20th Antenna Measurement Techniques Association (AMTA), 1998, pp. 221–226.

Wei, P. S. P. et al., "Uncertainty Analysis on the RCS Measurements from Calibration Objects," Proc. 23d Antenna Measurement Techniques Association (AMTA), Symposium, Denver, CO, Oct. 22–26, 2001, pp. 123–128.

* cited by examiner

Primary Examiner—John B. Sotomayor
(74) Attorney, Agent, or Firm—Black Lowe & Graham PLLC

(57) ABSTRACT

A method and system for probing incident radar fields in a target test zone of a radar cross-section (RCS) test facility is provided. The present invention accomplishes probing by exploiting the angular radar response of a string or wire stretched horizontally or vertically through the test zone. One end of the string is fixed, while the other end is moved by a wall-mounted or floor-mounted actuator. The angle of the string is gradually changed with respect to the direction of arrival of incident waves generated by the test facility. The radar echo from the string is measured as a function of the string angle. The data is then processed to yield a profile of the incident wave intensity along the string. This probing can be routinely achieved for any desired frequency.

26 Claims, 10 Drawing Sheets

SYSTEM AND METHOD FOR EVALUATING UNIFORMITY OF A WAVE FIELD IN A RADAR CROSS SECTION TEST RANGE

FIELD OF THE INVENTION

This invention relates generally to test ranges and, more specifically, to radar test ranges.

BACKGROUND OF THE INVENTION

A radar cross-section (RCS) test range is a facility for measuring the radar scattering properties of test objects, such as aircraft and missiles. Dozens of anechoic chambers and outdoor test ranges have been built over the years to measure target RCS properties. These facilities provide a "quiet" test zone for measuring the radar signature of a test object. "Quiet" means that the incident radar wave in the test zone is acceptably free from undesired interference or unwanted reflections from elsewhere in or on the test range.

Because operating conditions of a test range can change with equipment and arrangement of radar absorbers, as well as with time, it is considered good practice to probe the range (test zone) at regular intervals to ensure that radar fields within the test zone behave as expected. However, the time and equipment demanded for field probing put additional cost burdens on the test program. Without a probe of the field, actual measurements on the range remain unquantified.

Though it would be impractical to probe the field everywhere in the test zone, it is generally regarded as acceptable to probe it along a single vertical path and along a single horizontal path that intersect at a nominal center of the target zone. Both paths should be perpendicular to the direction of arrival of the incident wave (i.e., perpendicular to the longitudinal axis of the range).

The classic probe ordinarily used to sample the fields in the target zone is a small active antenna or a small passive reflector (scatterer). In either case, the received probe signal is measured as a function of position across the test zone. It is deemed acceptable to translate the probe along a single horizontal path and along a single vertical path through the target zone.

Active probes (antennas) are mounted on carriages that can be rolled along the floor or ground or that can be jacked up along vertical towers. The probe antenna is indexed along the desired path at discrete intervals, and the position of the probe is read from scales marked on the floor or along the tower. The received signal must be manually recorded for its probe position, so that the signal strength may be charted as a function of the probe position.

One improvement is that the manual procedure is automated by the installation of a set of shaft encoders to continuously report carriage position, whether horizontal or vertical, to a data collection system. However, because the carriage systems are physically large and robust, it takes much time and effort to assemble them, and radar reflections from their sheer bulk tend to contaminate the test zone being probed.

An alternative to current carriage systems is to use a passive scatterer installed on a low-reflection target support device, such as a pylon or a plastic-foam tower. The signal received by the facility's resident echo-measuring instrumentation system is measured as a function of position across the test zone. However, the target support device contaminates the measurement. This contamination is especially severe at lower radar frequencies.

Thus, there is an unmet need for a fast, accurate, and more cost effective method of performing a field probe.

SUMMARY OF THE INVENTION

The present invention allows probing incident radar fields in a target test zone of a radar cross-section (RCS) test facility in a fraction of the time that is used by conventional methods. The present invention accomplishes probing by exploiting angular radar response of a string or wire stretched horizontally or vertically through the test zone. One end of the string is fixed, while the other end is moved by a wall-mounted or floor-mounted actuator. Thus, the angle of the string is gradually changed with respect to the direction of arrival of the incident wave. The radar echo from the string is measured as a function of the string angle. The data is then processed to yield a profile of the incident wave intensity along the string. This probing can be routinely achieved for any desired frequency.

The radar echo includes an in-phase component and a quadrature component. In order to yield a profile of the incident wave intensity Fast Fourier Transforms of the in-phase and quadrature components are taken.

In one aspect of the invention, the radar test zone is in an indoor or outdoor radar test range.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
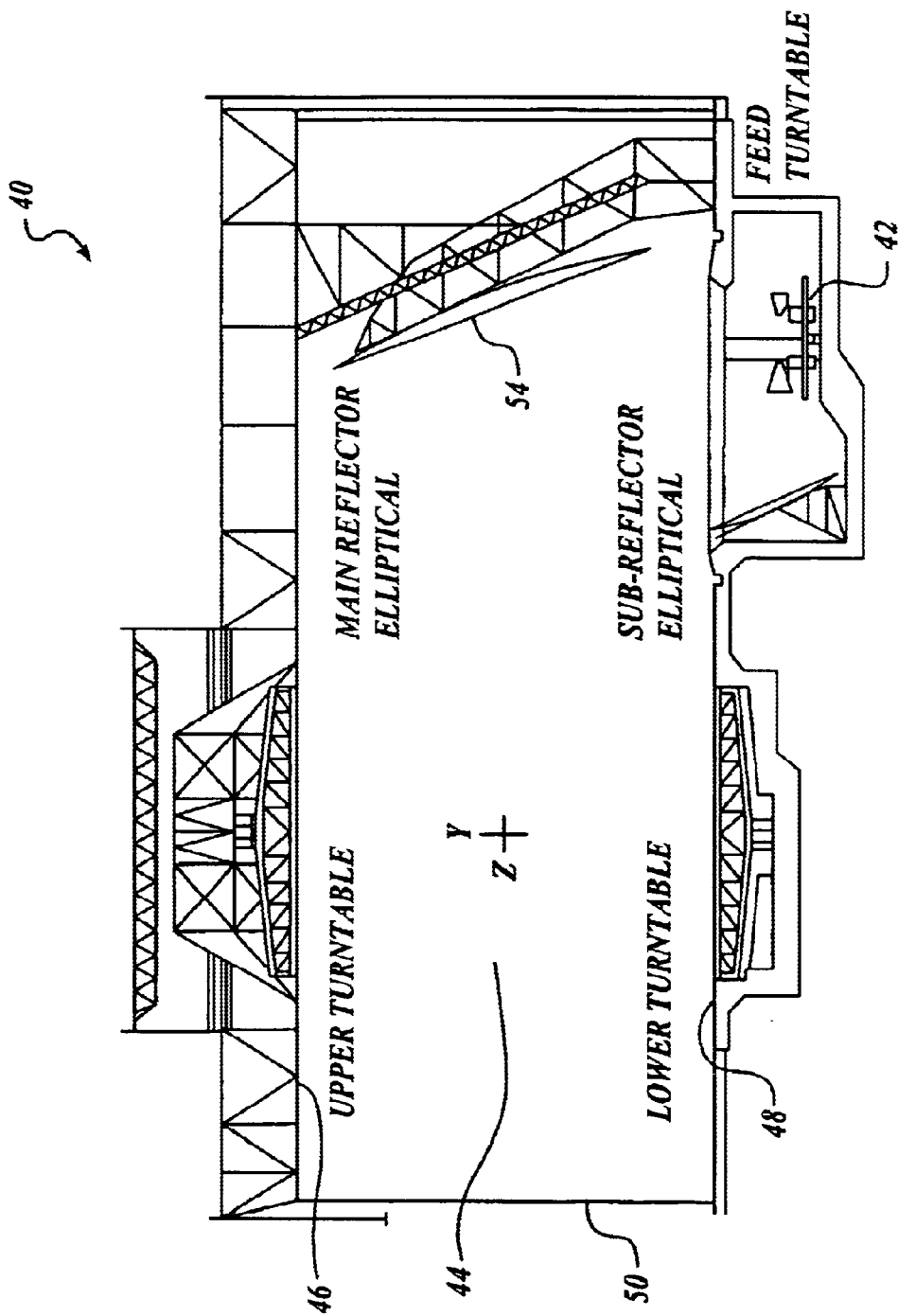
FIG. 1 is a cross-sectional view of a radar test range.

FIG. 1 is a cutaway side view of an example radar test range 40 formed in accordance with the present invention. The range 40 includes a radar system 42 that transmits a radar signal at a predetermined frequency, pulse width, pulse repetition rate, or scan pattern into a test zone 44. The test zone 44 is defined by the space within a ceiling 46, a floor 48, an end wall 50, and sidewalls (not shown). The floor 48 and the ceiling 46 include turntables that provide motion for test objects. The radar test range 40 is an indoor range, but it can be appreciated that the radar test range can be an outdoor range.

The test zone 44 is a space defined by x, y, and z-axes. The z-axis extends from a main radar reflector 54 of the radar system 42 to the end wall 50. The y-axis is orthogonal to the z-axis and extends between the ceiling 46 and the floor 48. The x-axis is orthogonal to the y and z-axes.

Figure 2:
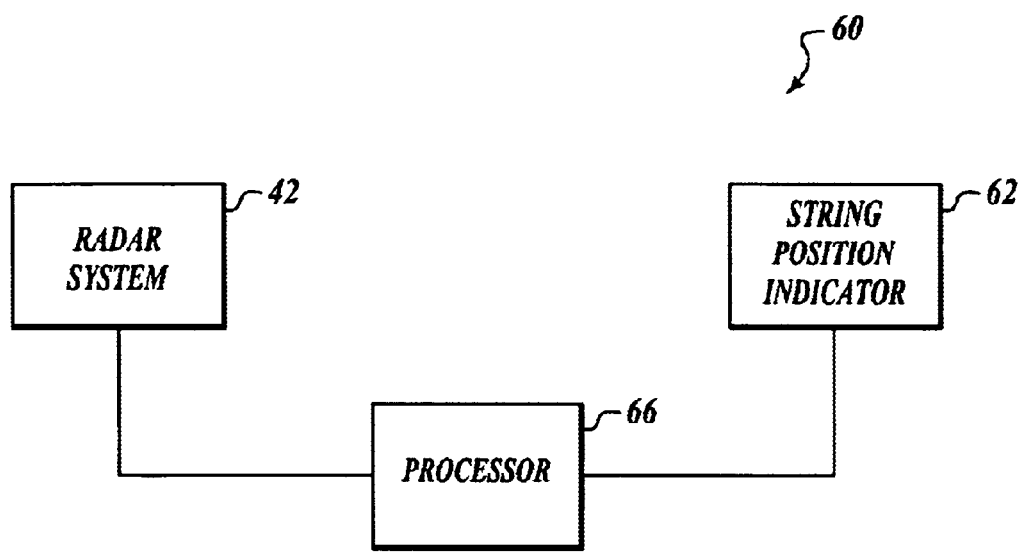
FIG. 2 is a block diagram of components of the present invention.

FIG. 2 is an example block diagram of a system 60 formed in accordance with the present invention for analyzing a test zone of a test range, such as the test zone 44 of the test range 40. The system 60 includes a radar system such as the radar system 42, a string position indicator 62, and a processor 66. The radar system 42 sends an incident wave (radar signal) towards a linear scatterer, such as a string or a wire (not shown) mounted within the test zone 44. The incident radar wave propagates along the z-axis to produce a substantially flat incident wave, thereby simulating a far field situation. The processor 66 receives radar return data of the string. The processor 66 also receives position information of the string from the string position indicator 62. The processor 66 generates an analysis of the test zone 44 to determine properties of the far field radar signal.

Figure 3:
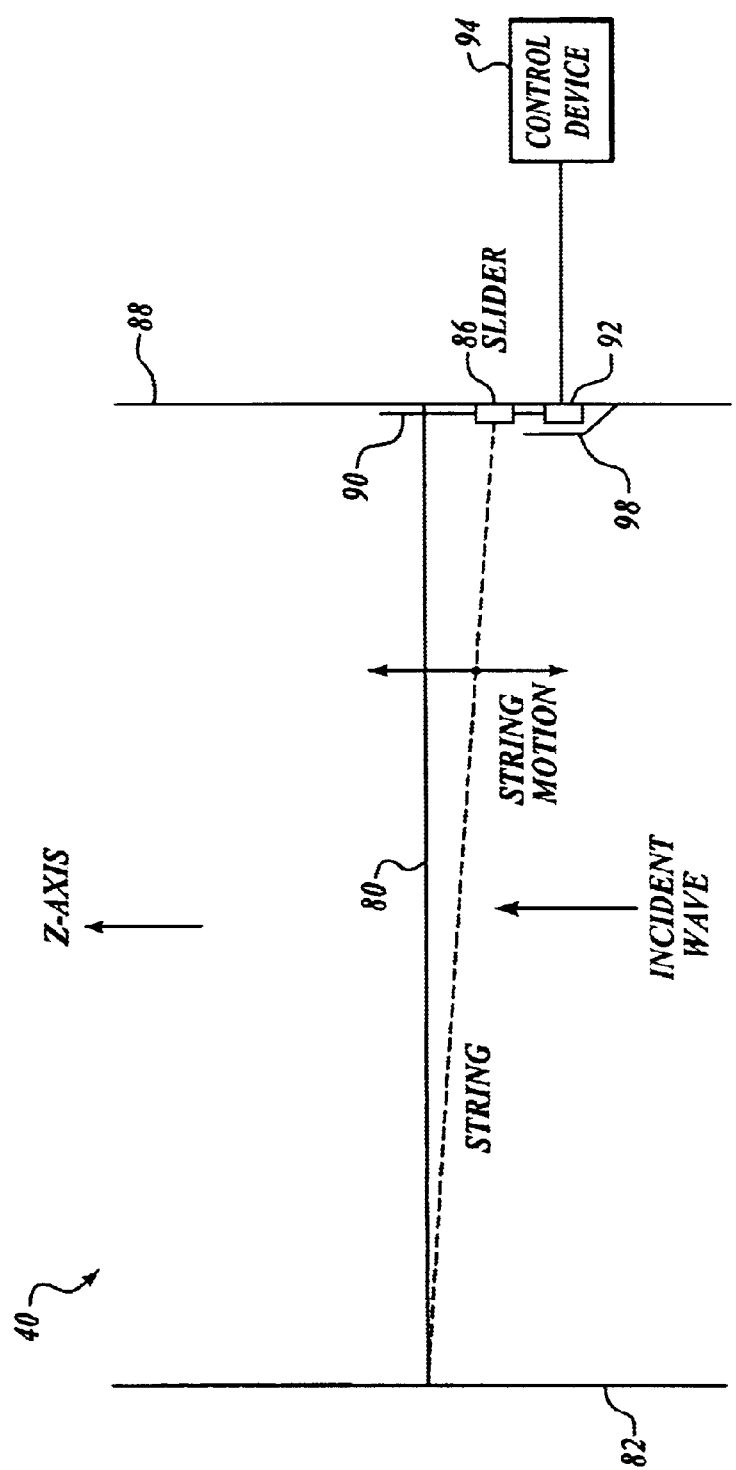
FIG. 3 is a top plan view of components of the present invention.

As shown in one embodiment in FIG. 3, a string 80 is attached to a left sidewall 82 of the range 40 and runs horizontally across the range 40 to a string attachment device 86 that is attached to a right sidewall 88. The string 80 is suitably under approximately 5 pounds of force, but can be under more or less force depending upon the type of string or wire used. The string attachment device 86 slides on a shaft 90. An actuator 92 controls the position of the string attachment device 86 on the shaft 90 and is electrically coupled to a control device 94. The control device 94 is preferably remotely located from the range 40. The actuator 92 tilts the string 80 with respect to the z-axis as the system 60 transmits and receives radar signals into the test zone 44. In one non-limiting example, the shaft 90 is a drive screw that is rotated by the actuator 92 that is a small electric motor. This in turn forces the string attachment device 86 towards or away from the motor. The string position indicator 62 is coupled to the string attachment device 86 or the actuator 92 for determining the position of the string 80.

A shield 98 covered by a radar absorber is mounted to the sidewall 88 for protecting the actuator 92 from the radar signal. The actuator 92 is suitably capable of moving the string 80 approximately 5 degrees to either side of the position orthogonal to the incident wave. It can be appreciated that the string 80 can be attached to the ceiling 46 and the floor 48 in order to test incident waves in the vertical plane. The string 80 can be setup between any horizontal and vertical angles.

Figure 4:
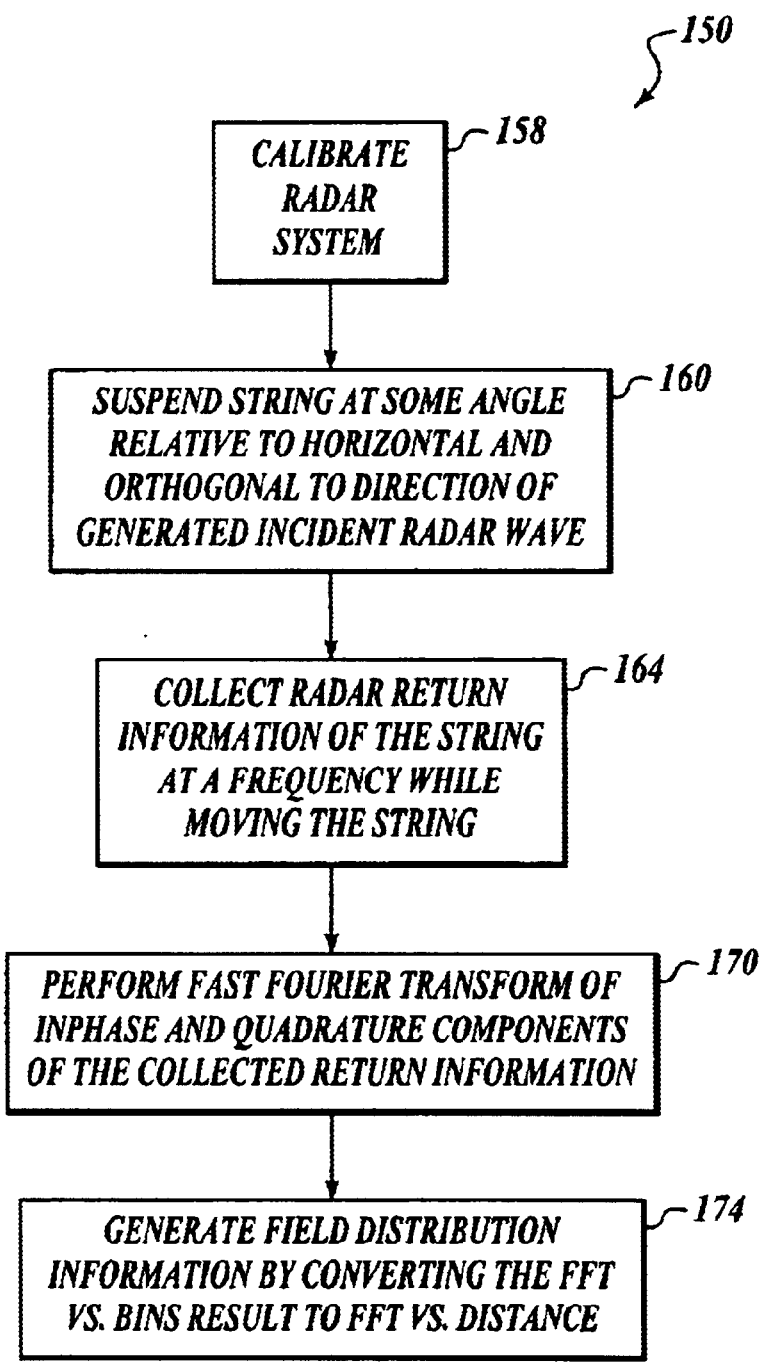
FIG. 4 is a flow diagram illustrating a process for determining test zone characteristics.

FIG. 4 illustrates an exemplary process 150 performed by the system 60 shown in FIG. 2. The process 150 begins by performing a calibration of the radar system 42 at a block 158. Calibration of the radar system 42 is performed by known calibration methods. In a block 160, a string is mounted within a radar range approximately orthogonal to the direction of travel of an incident wave produced by the radar system 42. The string 80 can be mounted at an angle relative to horizontal. At a block 164, the radar system 42 collects radar return information of the string 80 at the predetermined frequency while the string 80 is moved between predefined threshold angles out-of-plane with the incident wave. It will be appreciated that the radar system 42 steps the frequency of the incident wave through a plurality of frequencies as the string 80 is being moved. Next, at a block 170, the collected frequency sweep information is processed using a Fast Fourier Transform (FFT). At a block 174, field distribution information is generated by converting each range bin number result of the FFT to a distance value.

It will be appreciated that the frequency of the generated incident wave can be varied (i.e., stepped), as shown in the example described with respect to FIGS. 6–10. By varying the frequency while the string 80 is moved, radar return information of the moving string 80 can be attained for a plurality of frequencies at the same time.

Figure 5:
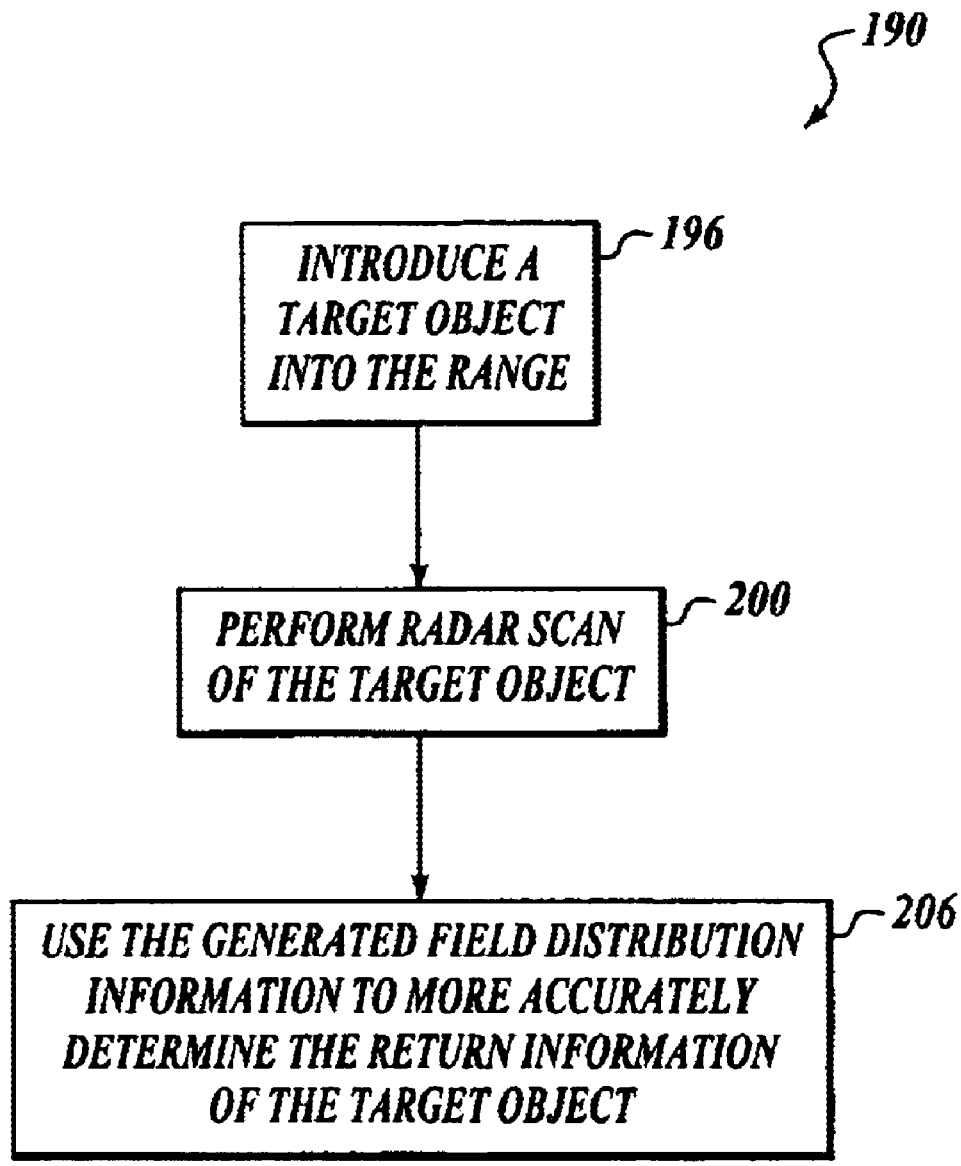
FIG. 5 is a flow diagram illustrating a process for using the determined test zone characteristics when performing radar scanning of test objects.

FIG. 5 illustrates a process 190 for using the results of the process 150 when running test objects through the range. At a block 196, a target object is introduced into the range. At a block 200, radar return results are received of the introduced target object. At a block 206, the generated field distribution information from FIG. 4 is used to determine if the return information of the target object is acceptable.

EXAMPLE

Figure 6:
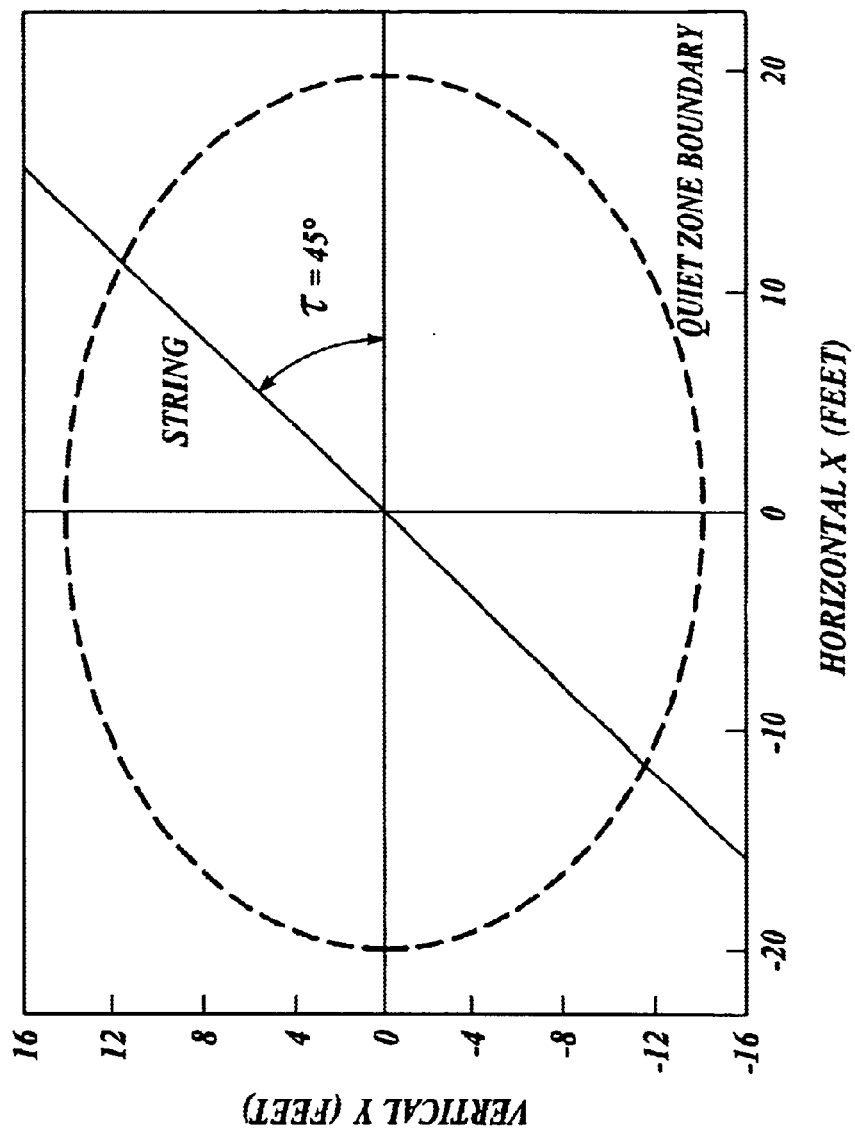
FIG. 6 is a radar view of a string mounted within a radar test range.

In the following example, 0.045-inch diameter braided rope (not shown), made of 12-strand high-molecular weight polyethylene fibers was used as the string 80. As shown in FIG. 6, the upper end of the string is wound through a drop-tube extended downward from a rim of an upper turntable (UTT). The lower end of the string is anchored to the chamber floor at one side of the chamber. The string is stretched diagonally across the quiet zone at approximately a 45° tilt-angle.

Figure 7:
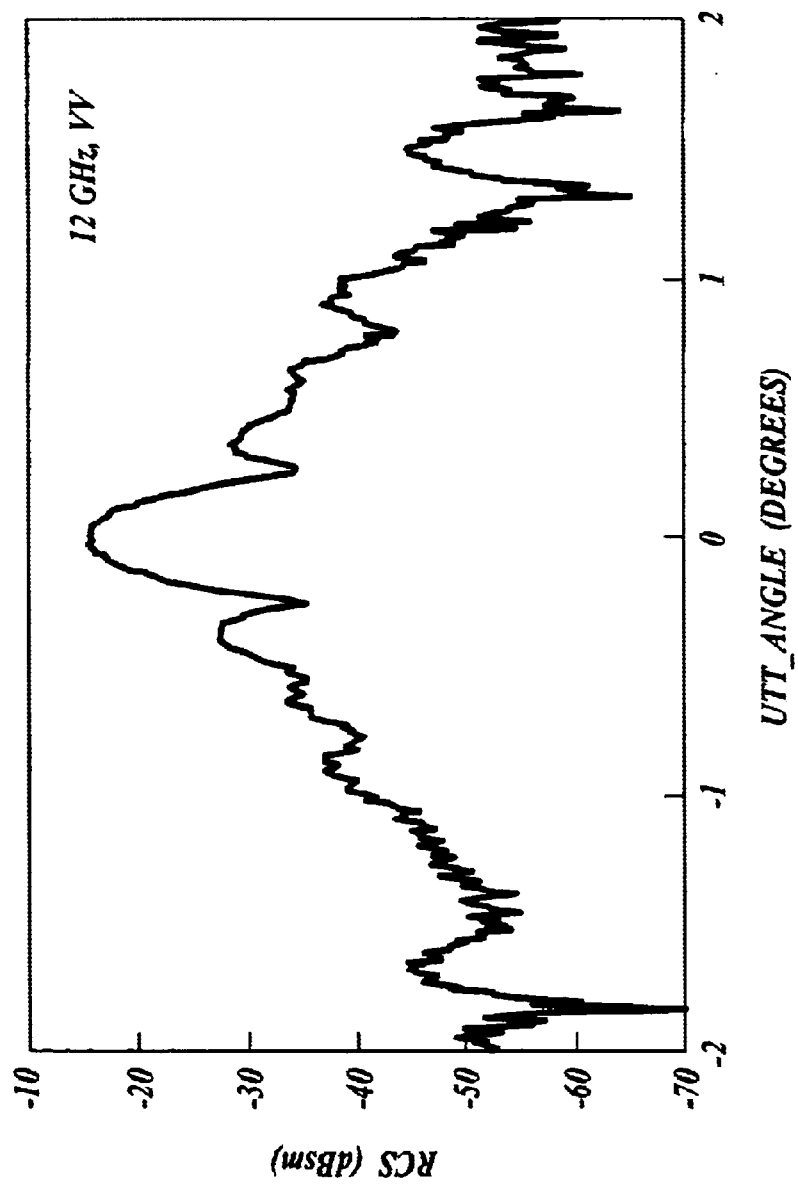
FIGS. 7–10 are charts of example data of a radar test range based on the present invention.
Figure 8:
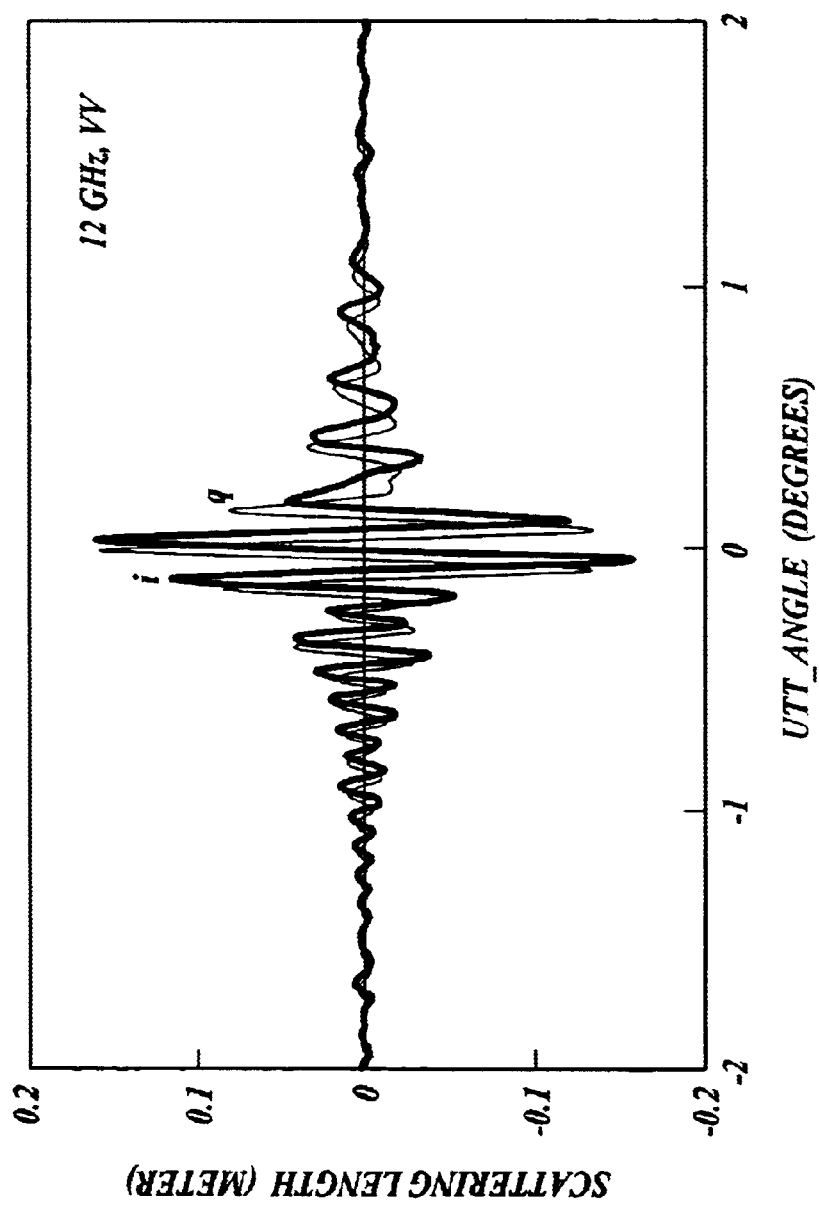

When the UTT is rotated, the angle between the string and the direction of arrival of the incident radar wave is changed, thereby varying the radar response of the string. An example of the angular radar response in a test range is as shown in FIG. 7 for a frequency of 12 GHz and vertical transmit/vertical receive (VV) polarization. The angular radar response (echo) is charted in logarithmic scale in decibels-square meter (dBsm). The radar response (echo) is strongest within a narrow angular range. The independent variable is the UTT-angle, which within a small inclination (±10°) from the vertical plane normal to the incident wave direction, is linearly proportional to the out-of-plane angle subtended by the string and the vertical plane. The UTT-angle for the broadside condition is defined as zero.

Measurement parameters for data of opportunity are summarized in the first four columns in Table 1.

TABLE 1

A Summary of Measurement Parameters and Results on Diagonal Distance Calibration for FFT Spectra.

| Band | UTT-Angle [Rotation] | Sample points | Freq (GHz) | Ctr_Bin measured | Distance (inch) | Error (%) |
|---|---|---|---|---|---|---|
| 5 | 18.525 [−8.7 to 9.9] | 1457 | 3.0 | 1392 | 681.179 | 0.31 |
|   |   |   | 3.5 | 1614 | 676.951 | −0.32 |
|   |   |   | 4.1 | 1905 | 682.036 | 0.43 |
| 6 | −21.831 [12.2 to −9.7] | 1481 | 4.2 | −2258 | 680.711 | 0.24 |
|   |   |   | 4.8 | −2572 | 678.479 | −0.09 |
|   |   |   | 5.5 | −2949 | 678.954 | −0.02 |
| 7 | 23.928 [−15.2 to 8.8] | 964 | 5.6 | 5029 | 675.017 | −0.60 |
|   |   |   | 6.8 | 6142 | 678.955 | −0.02 |
|   |   |   | 7.9 | 7170 | 682.260 | 0.46 |
| 8 | −24.557 [9.0 to −15.6] | 2563 | 8.0 | −2782 | 677.625 | −0.22 |
|   |   |   | 10.0 | −3491 | 680.256 | 0.17 |
|   |   |   | 12.0 | −4179 | 678.600 | −0.07 |
| 9 | 16.984 [−7.5 to 9.5] | 1335 | 12.5 | 5773 | 677.528 | −0.23 |
|   |   |   | 15.0 | 6950 | 679.737 | 0.09 |
|   |   |   | 18.0 | 8322 | 678.292 | −0.12 |
|   |   |   |   | Average = 679.105 |   |   |

The data in Table 1 were collected across five radar bands. The frequency step dF was 0.1 GHz for Bands 5 to 7, and 0.5 GHz for Bands 8 and 9. The range of UTT-angles, the number of sample points, the beginning and ending frequencies, as well as the central frequency for each band are also indicated.

Total variation in the UTT-angle is shown in Column 2 of Table 1. Because radar equipment (such as the feed horn) is physically changed in order to change operation from one band to another, five separate turntable rotations were used in this non-limiting example. The radar data was collected when the UTT was rotated at a constant rate of 0.5 revolutions per hour or 3°/minute. The UTT-angle increases for a clockwise (cw, from − to +) rotation, when the upper end of the string is tilted away from the radar. Within each band, the frequency is stepped by the increment dF starting from the low side. The frequency sweep is repeated as many times as desired. The UTT was rotated in the cw direction for the collection of the Band 9 data, then in the counterclockwise (ccw) direction for Band 8, and so on.

Column 3 of Table 1 lists the number of sample points. These samples ranged from as few as 964 in Band 7 to as many as 2563 in Band 8. Data was collected from 3 to 18 GHz for a total of 71 frequencies.

Each sample includes a coherent polarization scattering matrix, a set of four numbers (that is four functions), for each frequency and UTT-angle. The four numbers were obtained by alternately transmitting vertical and horizontal linear polarizations (V and H). For each of these functions, the vertical and horizontal polarizations of the scattered radar signal were simultaneously received. The four numbers or four transmit-receive combinations were VV, VH, HH, and HV. The co-polarized VV and HH echoes were very similar. Hence, only one (VV) was plotted in FIG. 7. Similar patterns were obtained for the cross-polarized VH and HV combinations (not shown), which were about 10 dB weaker than the VV pattern.

The VV pattern represents the intensity of the complex string response, which includes in-phase (i) and quadrature (q) patterns. The amplitudes of the i and q components are plotted in FIG. 8. as a function of the UTT-angle. To better present the oscillatory structure, only the results from −2° to 2° in the UTT-angle are shown. Each curve is approximately a 90° phase-shifted version of the other. With 104 pairs of i and q data per degree, there are about 13 to 16 points per oscillation, so that the peaks and valleys are sufficiently sampled. When the amplitude is normalized to scattering length in meter:

$$RCS(dBsm)=10*LOG\{i^2+q^2\} \quad (1)$$

The i and q are related by a Hilbert transform, which is well known to be valid where no response happens before the application of an impulse.

Figure 9:
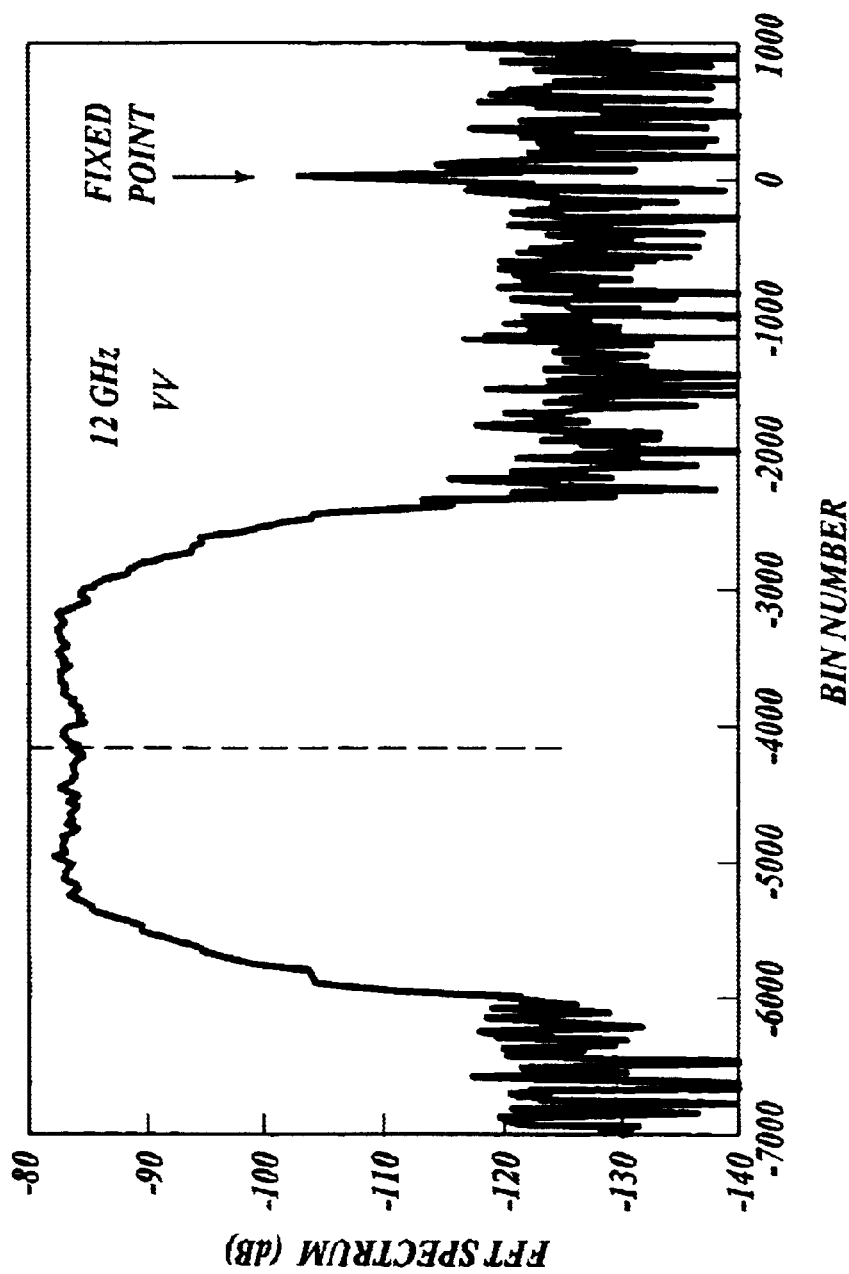

A FFT spectrum for Band 8 is generated by using a set of 2563 pairs of i & q data for the case of 12 GHz at the VV polarization. Using zero padding to 65536 complex points ($N=2^{16}$), the whole spectrum goes from bin-number −32767 to +32768, with its center at zero. However, only the portion containing relevant information from bin-number −7000 to 1000 is shown in FIG. 9.

The spectrum between bin-numbers −2400 to −6000 includes a plateau that is about 37 dB higher than a noise floor. This plateau charts the relative strength of the incident wave along the 45° string in dB, provided that the scattering from any unit segment of the string is the same. This illustrates a field probe of the incident field in the test zone. A narrow spike at bin zero (marked by an arrow) is readily identified with the fixed anchor point which is stationary during the out-of-plane movement of the string.

The present FFT algorithm puts the plateau feature for 12 GHz in the negative bins for a ccw rotation. A dashed line denotes the center of the plateau, which occurs at bin −4179. For a cw rotation, such as in the case of 12.5 GHz from Band 9, the plateau occurs in the positive bins, and its center occurs at bin 5773. If either i or q alone is used as input, then the FFT spectrum yields two symmetrical plateaus on both sides of the zero bin, each being 6-dB lower in intensity. Thus, either i or q contains information on the moving string. The sense of rotation is preserved only when both i and q are used.

The UTT-angle an i and q were all sampled as functions of time as the turntable moved one end of the string. The FFT algorithm used to transform the measured data from the angle domain to the cross-range domain does not care what each angle is, nor does it care what i and q represent. The FFT algorithm cares only that the number of points be sampled at equal steps, and that the total number of data be an integral power of 2, such as 1024, 2048, etc. Because the exact number of data points (pairs) in a measurement cannot be controlled, the number of data points is some number of data $D_a$ different from the power of 2. This can be remedied by adding Zp zeroes to the data set in order to bring the total number to a power of 2, i.e., $$D_a+Z_p=N=2^n \quad (2)$$

where n is an integer; and
Zp is number of zero padding.

The addition of zeroes improves granularity, but not resolution. For any FFT window-function, there are $\{(D_a/2)-1\}$ sidelobes on each side of the main peak in the FFT spectrum, independent of Zp. In this embodiment $N=2^{16}$.

When N=65536, the plateau in FIG. 9 extends over 2600 bins, which is of the same order as $D_a$=2563. The relative variation in the spectrum is satisfactorily represented when processed with $N=2^{12}$=8192, though the minimum for N is 4096. For each factor of 2 increase in the FFT processing size N, the bin numbers (before and after processing) are multiplied by 2, and the transformed spectrum is lowered by 6 dB. Otherwise, the characteristic signature of the plateau remains similar for N larger than 8192.

The plateau feature standing at 37 dB above the noise floor is due to the distribution of field intensity along the string at 45°. It will be appreciated that FFT does not indicate what each bin represents.

When the selected data sets are transformed using the FFT, relative power values as a function of bin number are charted, such as shown in FIG. 9. From each plateau, the central bin locations can be measured at several dB levels and take an average of the central bin locations. The averaged central bins are summarized in Column 5 of Table 1. The averaged central bins are different because each is a function of the frequency, UTT-angle swept, and the number of sample points. Also, the plateau center occurs on the "+" or "−" side, depending on the direction of UTT rotation, whether it is cw or ccw.

Because the objective is to generate a profile of the incident power in the test zone as a function of cross-range location, the cross-range distance to bin number is expressed as follows:

$$R/\lambda=J*(D_a-1)/(2W*A*N) \quad (3)$$

where R is the cross-range distance, λ is the radar wavelength, J is the bin number measured from zero, N (power of 2, padded with Zp zeroes) is the total size of the data set, $D_a$ is the number of measured data points, A is the UTT-angle swept, and W is the factor which converts the UTT-angle to the out-of-plane angle (in radian) for the angular string rotation. Note that λ=c/F, where c is the speed of light. The distance is always positive, because the "−" signs in the UTT-angle swept and the plateau-center, listed separately in Columns 2 and 5 of Table 1, cancel out.

With the plateau-center at J, and using the known parameters $D_a$, A, N, and λ in Equation (3), an equation of the type:

R*W=constant, for each of the 15 independent cases is obtained. Among the two variables R and W, one can be solved if the other is known. With a value of W=0.27624, the computed distance and its error percent are summarized in Columns 6 and 7 of Table 1. The errors are on the order of a few tenths of a percent. The errors are not directly measured but are obtained by processing in the Fourier domain. The results also demonstrate the self-consistency of the FFT spectra for a wide range of frequencies from 3 to 18 GHz.

With the bin number to cross-range distance calibrated, the FFT spectrum versus the distance along the 45° diagonal line can be plotted. As an example, the data for the 12 GHz VV case is plotted in FIG. 10, together with the HH results, plus those for the 10 and 8 GHz cases, all from Band 8.

Figure 10:
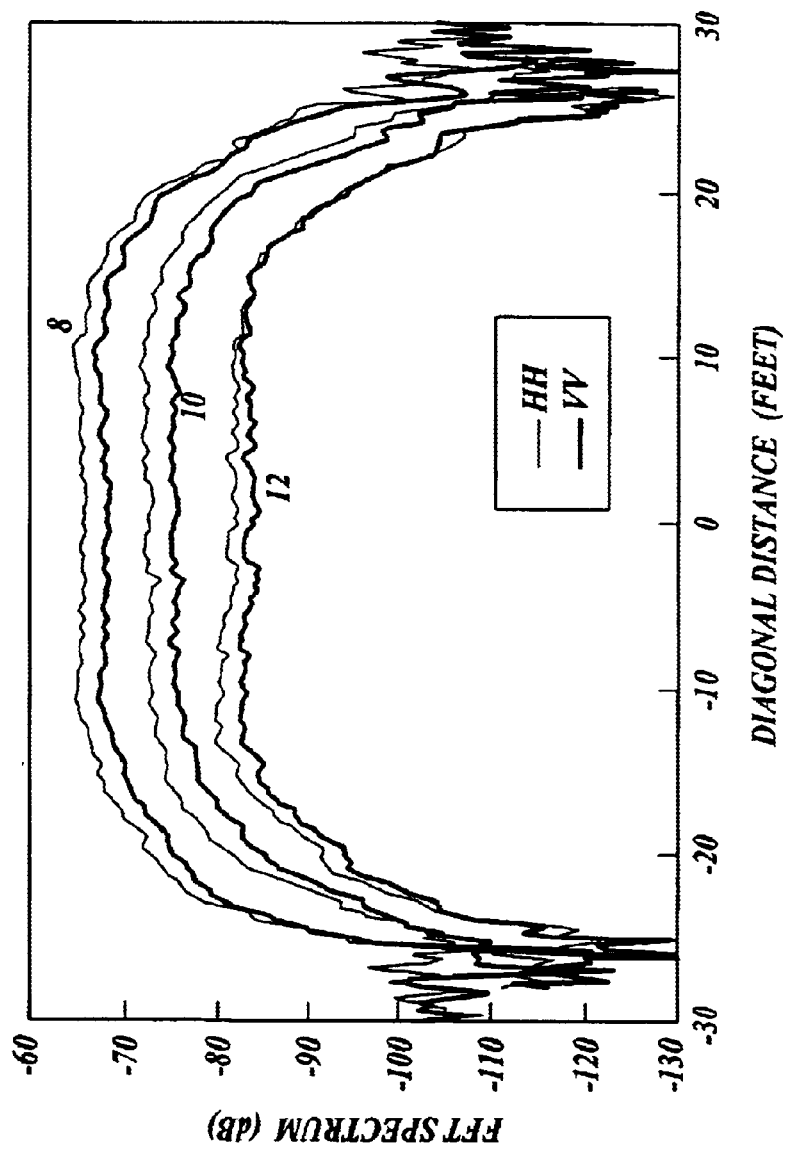

In FIG. 10, three sets of transformed data are shown, each set of which was measured for the VV and HH polarization combinations. The dB scale is for the 12 GHz VV case, whereas the 10 GHz VV and the 8 GHz VV traces are shifted upward by 10 and 20 dB, respectively. The HH traces (thin curves) are shifted upward by 2 dB from the respective VV traces (thick curves). These separations are artificial and are meant for clarity. This does not change the information contained in the three sets of traces.

The VV and HH spectra are similar to each other for a given frequency. By using the averaged J, the VV and HH spectra appear on the same distance scale though the spectra may be slightly displaced from each other. The ripple structures are progressively different for different frequencies. By defining the origin of the distance at the center of the quiet zone, the fixed anchoring point on the chamber floor is now at −679.1 inches from the center, which is offside to the left (not shown). On a closer look, the left and right features for the 12 GHz VV case are reverse with respect to those in FIG. 9, and the 12 GHz HH spectrum is weaker on the right side. Within + or −13 feet from the center, the intensity distribution is fairly flat, as depicted on the ordinate scale of 10 dB per division. Outside of + or −16 feet from the center, the intensity decreases rapidly. This is in accordance with FIG. 6, in that the 45°-string bound by the ellipse is of length 32 feet 5 inches. In general, the ripples appear to be broader and milder at a lower frequency but narrower and sharper at a higher frequency.

From the results described above, the FFT spectrum from the angular response of a string represents the field intensity along the string.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A method for determining characteristics of a radar wave field in a radar test range, the method comprising:
   suspending a string approximately perpendicular to direction of travel of expected incident radar waves generated by the radar test range;
   generating incident radar waves at a desired frequency;
   changing angle of the string with respect to the direction of travel of the generated incident radar waves;
   sensing the angle of the string;
   collecting return information of the string based on the sensed angle of the string; and
   determining characteristics of the radar wave field based on the collected return information.

2. The method of claim 1, wherein determining the characteristics of the radar wave field includes determining intensity of the incident radar waves along the string.

3. The method of claim 2, wherein the collected information includes an in-phase component and a quadrature component.

4. The method of claim 3, wherein determining intensity of the incident radar waves includes performing Fast Fourier Transforms of the in-phase and quadrature components.

5. The method of claim 2, wherein generating incident radar waves at a desired frequency includes stepping the generating incident radar waves through a plurality of desired frequencies separated by a predefined frequency interval.

6. The method of claim 5, wherein the collected information includes an in-phase component and quadrature components for each frequency.

7. The method of claim 6, wherein determining intensity of the incident radar waves includes performing Fast Fourier Transforms of the in-phase and quadrature components for a desired frequency.

8. The method of claim 1, wherein the radar wave field is included within at least one of an indoor or outdoor radar test range.

9. The method of claim 1, wherein the string is fixedly attached at a first end and attached to a device at a second end for changing angle of the string with respect to the direction of travel of the generated incident radar waves.

10. The method of claim 9, wherein the device includes an actuator and a radar shield.

11. A system for determining characteristics of a radar wave field in a radar test range, the system comprising:
   a radar system configured to generate incident radar waves at a desired frequency in a direction approximately perpendicular to a suspended string;
   a device configured to change an angle of the string with respect to the direction of travel of the generated incident radar waves;
   a sensor configured to sense the angle of the string; and
   a processor including:
      a first component configured to collect return information of the string based on the sensed angle of the string; and
      a second component configured to determine characteristics of the radar wave field based on the collected return information.

12. The system of claim 11, wherein the second component is further configured to determine intensity of the incident radar waves along the string.

13. The system of claim 12, wherein the collected information includes an in-phase component and a quadrature component, and the second component includes a means for performing Fast Fourier Transforms of the in-phase and quadrature components.

14. The system of claim 12, wherein the radar system is further configured to step the generating incident radar waves through a plurality of desired frequencies separated by a predefined frequency interval.

15. The system of claim 14, wherein the collected information includes an in-phase component and quadrature components for each frequency, and the second component includes a component configured to perform Fast Fourier Transforms of the in-phase and quadrature components for a desired frequency.

16. The system of claim 11, wherein the radar test range is at least one of an indoor or outdoor radar test range.

17. The system of claim 11, wherein the string is fixedly attached at a first end and attached to a device at a second end for changing the angle of the string with respect to the direction of travel of the generated incident radar waves.

18. The system of claim 17, wherein the device includes an actuator and a radar shield.

19. A radar test range including a wave field, the radar test range comprising:
   a string suspended approximately perpendicular to the direction of travel of an expected incident radar wave;
   a radar for generating incident radar waves at a desired frequency in a direction approximately perpendicular to a string;
   a device coupled to one end of the string for changing angle of the string relative to the direction of travel of the generated incident radar waves;
   a sensor for sensing the angle of the string; and
   a processor coupled to the sensor for collecting return information of the string based on the sensed angle of the string, and for determining the characteristics of the radar wave field based on the collected return information.

20. The radar test range of claim 19, wherein the processor further determines intensity of the incident radar waves along the string.

21. The radar test range of claim 20, wherein the collected information includes an in-phase component and a quadrature component and the processor further performs Fast Fourier Transforms of the in-phase and quadrature components.

22. The radar test range of claim 20, wherein the means for generating incident radar waves at a desired frequency includes a means for stepping the generating incident radar waves through a plurality of desired frequencies separated by a predefined frequency interval.

23. The radar test range of claim 22, wherein the collected information includes an in-phase component and quadrature components for each frequency, and processor performs Fast Fourier Transforms of the in-phase and quadrature components for a desired frequency.

24. The radar test range of claim 19, wherein the radar test range is at least one of an indoor or outdoor radar test range.

25. The radar test range of claim 24, wherein the string is fixedly attached at a first end to one of a wall or floor of the radar test range and at a second end to a device for changing the angle of the string with respect to the direction of travel of the generated incident radar waves.

26. The radar test range of claim 25, wherein the device for changing the angle of the string includes an actuator and a radar shield.

* * * * *